United States Patent
Perry et al.

(10) Patent No.: US 6,252,547 B1
(45) Date of Patent: *Jun. 26, 2001

(54) METHOD AND APPARATUS FOR LIMITING ACCESS TO SIGNALS DELIVERED VIA THE INTERNET

(75) Inventors: Jack Perry; David J. Cechota, both of Cedar Rapids; Kenneth A. Franken; Toufic T. Moubarak, both of Iowa City, all of IA (US)

(73) Assignee: Decisionmark Corp., Cedar Rapids, IA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/538,215

(22) Filed: Mar. 30, 2000

Related U.S. Application Data

(63) Continuation-in-part of application No. 09/092,128, filed on Jun. 5, 1998, now Pat. No. 6,147,642.

(51) Int. Cl.[7] .............................. H04B 7/185; H04B 7/00
(52) U.S. Cl. ................ 342/367; 342/357.06; 342/357.15
(58) Field of Search ..................... 342/357.06, 357.09, 342/357.1, 357.15, 357.16, 367; 455/12.1, 272, 131

(56) References Cited

U.S. PATENT DOCUMENTS 5,535,430 * 7/1996 Aoki et al. ........................ 455/54.1
5,950,127 * 9/1999 Nitta et al. ........................ 455/426
6,147,642 * 11/2000 Perry et al. ...................... 342/357.15

FOREIGN PATENT DOCUMENTS 6-268934 * 9/1994 (JP).

* cited by examiner

Primary Examiner—Dao Phan
(74) Attorney, Agent, or Firm—Simmons, Perrine, Albright & Ellwood PLC

(57) ABSTRACT

An apparatus for controlling the reception of electronic digital signals, which could include internet signals as a function of the location of a receiver for receiving said internet signals and further as a function of the signal strength of a terrestrially broadcast television signal at said location of the internet receiver is disclosed. In one embodiment, a GPS receiver and a radio receiver are utilized to control the reception at the location. In another embodiment, a distributed approach is utilized which uses at least two separated servers in which one is used for inputting information relating to a location of the internet receiver, and another server is utilized for determining the relationship of the signal strength of that position to a predetermined threshold and either directly through a hardware connection or indirectly through a display terminal providing for manipulation of the internet receiver and internet transmitter combination so as to restrict access to signal reception by said internet receiver at the location if a strength of a terrestrially broadcast television signal exceeds a predetermined threshold.

20 Claims, 2 Drawing Sheets

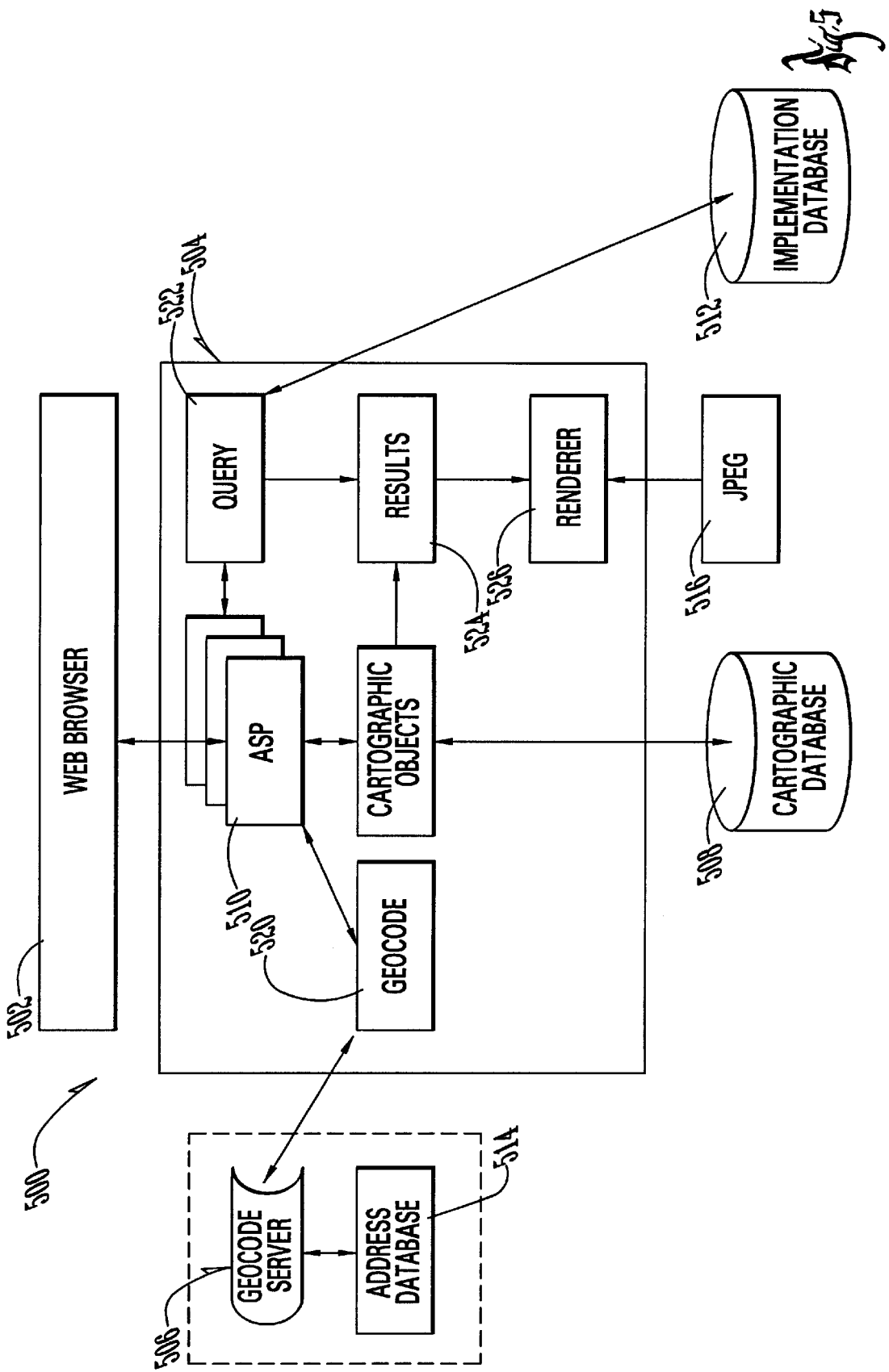

METHOD AND APPARATUS FOR LIMITING ACCESS TO SIGNALS DELIVERED VIA THE INTERNET

This application is a continuation-in-part application of prior application Ser. No. 09/092,128 filed on Jun. 5, 1998, now U.S. Pat. No. 6,147,642 issued on Nov. 14, 2000.

FIELD OF THE INVENTION

The present invention relates to satellite communication and more particularly relates to regulation of access to satellite communication signals via electronic means responsive to geographic reference signals.

BACKGROUND OF THE INVENTION

In the past, network television signals were only receivable by viewers receiving signals broadcast from terrestrial transmitters at distributed network affiliate stations. As a result, in years past, many remote and rural areas of the U.S. had either no, or very limited, access to network television service. With the advent of satellite communications, many of these remote viewers are now able to receive network programming; however, many of the networks would like to restrict the availability of these signals to only those customers in locations which are unable to receive signals broadcast from network affiliate stations. The difficulty in meeting the networks' desires is increased by the fact that today more and more homes and business are located in remote areas and further, by the use of television satellite receivers on recreational vehicles which are able to move in and out of remote areas.

Consequently, there exists a need for improved methods and apparatuses for determining and regulating the availability of access to satellite communication signals.

SUMMARY OF THE INVENTION

It is an object of the present invention to provide enhanced abilities to quickly and easily regulate access to satellite communication signals.

It is a feature of the present invention to include an apparatus for determining a geographic reference point for a particular satellite customer.

It is an advantage of the present invention to achieve a more accurate assessment of the quality of terrestrial broadcast signals at a particular location.

It is another object of the present invention to provide a real time determination of access to satellite communication signals.

It is another feature of the present invention to include a geographic reference point for a particular location.

It is another feature of the present invention to include a GPS receiver for generating geographic reference points for a mobile satellite receiver.

It is another object of the present invention to provide low cost determination of the availability of access to satellite communication signals.

It is yet another feature of the present invention to include a distributed processing system.

It is another advantage of the present invention to reduce cost by using existing computing resources and a central location for application specific resources.

It is another object of the present invention to provide wide accessibility to resources for determining access to satellite communication signals.

It is another feature of the invention to utilize computer networks, such as the Internet, for interconnecting several components of a distributed system.

The present invention is a method and apparatus for determining and regulating the access to satellite communication signals based upon a determination of a geographic position for a potential satellite signal receiver, which is designed to satisfy the aforementioned needs, provide the previously stated objects, include the above-listed features and achieve the already articulated advantages. In the present invention, the time required, the difficulty and the expense associated with accurately regulating access to satellite communication signals has been reduced.

Accordingly, the present invention is a method and apparatus for determining and regulating access to satellite communication signals by reference to a geographic determination of the location of a potential satellite receiver and a generation of a signal representative of a signal strength of terrestrially broadcast television signals at a particular location.

BRIEF DESCRIPTION OF THE DRAWINGS

The invention may be more fully understood by reading the following description of the preferred embodiments of the invention, in conjunction with the appended drawings wherein:

FIG. 5 is a block diagram of the major functional components of a system of the present invention in which the dashed lines encircle portions of the system implemented on a single server and the dotted and dashed line represent portions of the system implemented on a separate server.

DETAILED DESCRIPTION OF THE DRAWINGS

Figure 1:
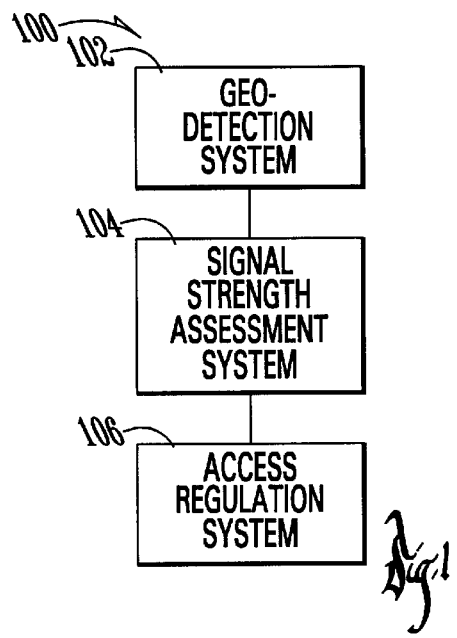
FIG. 1 is a block diagram of the major functional components of a system of the present invention.

Now referring to the drawings, wherein like numerals refer to like matter throughout, and more specifically to FIG. 1, there is shown a satellite communication regulating system of the present invention generally designated 100, having a geodetection system 102, a signal strength assessment system 104 and an access regulating system 106.

In various embodiments of the present invention, the functions of systems 102, 104 and 106 have varying levels of physical distribution. For example, in systems for real time regulation of mobile satellite receivers (see FIG. 2 and accompanying text), all systems may be co-located with the mobile satellite receiver. The expense of this approach may be unnecessary for other less mobile needs. For example, in another potential embodiment, the majority of the system can be performed by one personal computer with specially designed software. In yet another embodiment, use can be made of existing software, such as web browsers and portions of the system's functions can be distributed to end users operating personal computers not dedicated solely to the task of regulating access to a satellite communication system (see FIG. 3 and accompanying text). While the process can be further distributed to various clients and a central server (see FIG. 4 and accompanying text).

Figure 2:
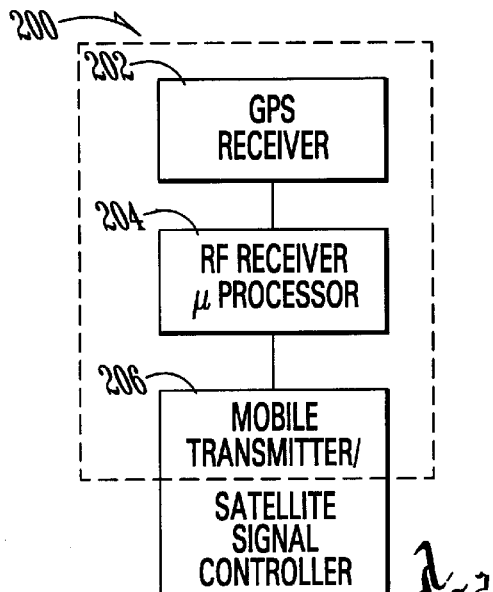
FIG. 2 is a block diagram of the major functional components of a system of the present invention in which the dashed lines encircle portions of the system coupled to the satellite receiver.

Now referring to FIG. 2, there is shown an apparatus of the present invention generally designated 200, having a GPS receiver 202 which essentially performs the function of block 102 of FIG. 1. The dotted line in FIG. 2 encircles the components of the present invention which are co-located with a mobile satellite receiver. The GPS receiver determines the location of the mobile satellite receiver and generates a geocode or lat-long reference signal corresponding to the current location of the mobile satellite receiver. This signal is provided to RF receiver/microprocessor 204. The microprocessor is used to tune the frequencies of local network television affiliates in the vicinity of the location determined by the GPS receiver. The RF receiver determines the signal strength of the received signals and the microprocessor compares the signal strengths to a predetermined threshold. Based upon the results of the comparison, a determination of access to network satellite signals is made. Coupled to RF receiver/microprocessor 204 is mobile transmitter/satellite signal controller 206. Block 206 includes a mobile transmitter which transmits the results of the comparison of the signal strengths to a predetermined threshold to a remote location in which the satellite signal controller is located. The satellite signal controller is well known in the art of generation and control of satellite signals and is used to permit and/or restrict access to network television signals broadcast from a satellite by including an ID code which enables remote satellite receivers to fully utilize the satellite signals. These satellite signal controllers are currently in use and well known in the art.

Figure 3:
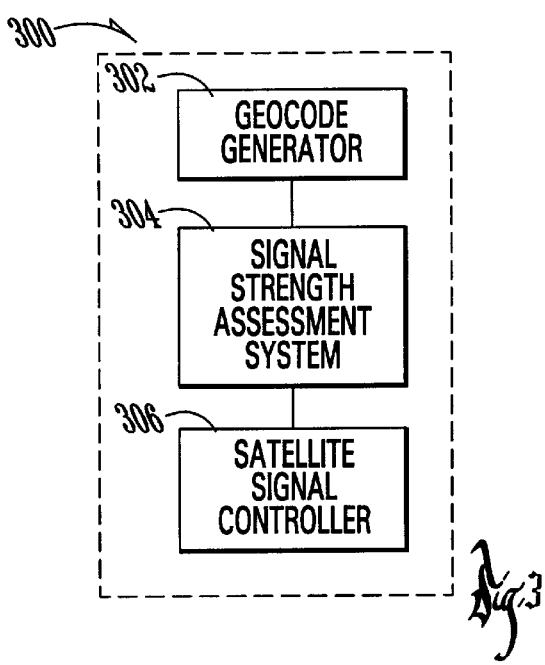
FIG. 3 is a block diagram of the major functional components of a system of the present invention in which the dashed lines encircle portions of the system located at a satellite signal control station.

Now referring to FIG. 3, there is shown an embodiment of the present invention generally designated 300 having a geocode generator 302, a signal strength assessment system 304 coupled thereto and a satellite signal controller 306. The entire blocks 302, 304 and 306 are shown to be enclosed within the dashed line of FIG. 3 thereby representing that all of these functional blocks are co-located and are typically disposed or coupled to the well-known apparatus for uplinking information to communication satellites. The entire system 300 could be performed on a single computer, such as a personal computer. The geocode generator would include an input/output capability in which an operator could input an address of a residence or business which utilizes a satellite receiver. The operator could enter the address and known geocode generators could generate latitude and longitude signals in response to the input address. This latitude/longitude determination would be used as an input in the signal strength assessment system in which local network television affiliates are identified in the vicinity of the lat-long reference generated by the geocode generator and a calculation of the signal strength of each of the local network affiliates can be calculated at each position determined by the geocode generator. If the signal strength falls below a predetermined threshold, then an access enabling determination is forwarded from Block 304 to Blocks 306. Block 306 would be the satellite's signal controller which would then generate an appropriate access code for transmission to the remote satellite receiver, thereby enabling reception of the network transmission. The benefits of the system 300 are that it can provide the ability to generate and regulate access to network transmissions in a costeffective manner. The obvious downside of system 300 in comparison to system 200 is that it is located at a fixed site and it does not allow for real time adjustment of the access to the network signals. Additionally, system 300 is limited to allowing access of input at one location.

Figure 4:
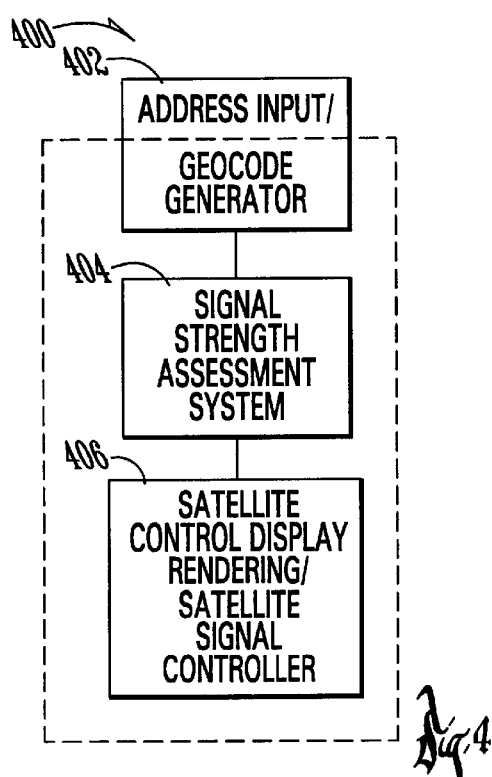
FIG. 4 is a block diagram of the major functional components of a system of the present invention in which the dashed lines encircle portions of the system located at a satellite signal control station.

Now referring to FIG. 4, there is shown a system of the present invention, generally designated 400, having an address input/geocode generation block 402 coupled to a signal strength assessment system 404 which is coupled to a satellite controlled display rendering system/satellite signal controller 406. The system 400 allows for a more distributed approach than does system 300, and the matter encircled by the dashed line in FIG. 4 represents the portions of the system which could be co-located. The address input component of Block 402 could be distributed to various users dispersed geographically, thereby allowing for increased use and access to the system 400. The address input function of Block 402 could be performed by common hardware and software in an effort to reduce the overall cost of implementing system 400. For example, the address input component of Block 402 could be performed by numerous personal computers using well known web browsers. The information could be input at various locations and transmitted over the Internet to a central location where the geocode generation component of Block 402 could transform the street address to a latitude and longitude. This latitude and longitude then could be utilized by signal strength assessment system 404 to make a determination of the signal strength of various local network television affiliates in the vicinity of the address input by the operator.

Now referring to FIG. 5, there is shown a system of the present invention generally designated 500 which provides for widely distributed processing capability, which includes at least one Web browser 502 disposed at a first location and on a first computer. This computer may be a typical IBM compatible computer operating on a Windows environment or any other computer capable of operating a Web browser or subsets of a Web browser. The Web browser 502 is coupled via a computer network to a satellite signal control server 504 located at a second location which is designated by the intermittent line and preferably is located on a single server and operates on industry standard Web server software such as Microsoft Internet Information Server (IIS) Version 3.0 or later. Server 504 hosts several Active Server Pages (ASPs) which contains scripts of actions to perform and programmatic steps to generate Hyper Text Markup Language (HTML) to be provided back to Web browser 502. Server 504 provides a novel mechanism for producing complex interaction without requiring sophisticated browser technology such as client side Java Applets or dynamic HTML (DHTML) on Web browser 502. Active Server Pages 510 may, but need not contain embedded therein scripts such as Visual Basic script (VB script) or Microsoft's dialect of JavaScript. The ASP 510 may be able to use any standard component that runs with an NT server environment, such as Microsoft-defined interfacing standard Component Object Model (COM). This enables designers to very early tailor the present invention to meet particular user requirements. All that a designer need do is customize the ASP 510 without the need for other changes to result in a customized interface with browser 502.

Coupled to server 504 is geocode server 506 which may be a separate process providing geocoding services. This geocode server may be any commercially available geocoder such as geocoders provided by QMS, Group 1 and MatchWare, all of which are known in the art, or in other implementation. The function of geocode server 506 could be provided by a GPS receiver. In a preferred embodiment, the geocode server 506 might be configured such that a "wrapping" or geocoding interface is interposed between the commercially available geocoders (QMS, Group 1, MatchWare, etc.) or a GPS receiver, so as to provide a uniform interface with the remainder of system 500. However, it is believed that in some instances, it may be preferable to operate servers 504 and 506 on independent computers. Server 504 is shown coupled to Cartographic database 508 and Implementation database 512. These may be standard Structured Query Language (SQL) databases which contain cartographic data and data specific to a particular implementation of the present invention. In one embodiment of the present invention, the implementation database 512 would contain information about specific television stations, including their DMA, call sign, network affiliation, and signal area map. It should be understood that in other applications, the databases would not contain television signal related information and would be tailored to include other information which is dependent upon and associated with certain predetermined locations. The cartographic database 508 may contain background cartography, such as state and county boundaries, interstate highways, and coastal water. These databases are preferably SQL databases that the Web server 504 accesses using standard Open Database Connectivity (ODBC) drivers. The present invention need not specify any particular database or database server platform, a candidate database need only provide an ODBC driver and be capable of storing SQL Binary Logic Objects (BLOBs). The preferred embodiment of the present invention uses Microsoft SQL servers running on an independent machine from the IIS server 504.

All databases 508, 512, and address database 514 of geocode server 506 may contain cartographic data which conforms to the Puckett database format. This format provides for standard encoding of cartographic shape data, and for storing that data directly within a standard SQL database.

Web server 504 may generate a geographical map 516 upon a request from a client operating Web browser 502. The map representation 516 may be in any industry standard graphics format, such as JPEG, PNG, GIF, or any suitable format.

The present invention may be more fully understood by reviewing its operation. In operation, the present invention performs as follows:

A user inputs a URL for a particular ASP of the server 504 into Web browser 502. Server 504 contains the active server page and generates and delivers a page with HTML to Web browser 502. The user enters a street address into Web browser 502 and transmits the same to server 504 which, with the aid of geocode function 520, identifies the need for geocoding the address and communicates the street address to geocode server 506, which accesses address database 514 and develops a latitude and longitude reference for the street address and provides the same back to geocode function 520. Query function 522 is called by ASP 510 to request a list of stations which match the given latitude and longitude coordinates in a particular DMA. The query object 522 makes a database query of implementation database 512 and calls the point-in-polygon function provided by the Puckett cartographic object library or other mechanism such as the signal strength assessor. The Query object 522 then generates a results object 524 to contain information about the identified relevant television stations.

In a second phase, the Active Server Page 510 goes through the information contained in the results object 524 and then emits an HTML table page that describes the relevant stations. This table may contain HTML code for hyperlinks that a client or user operating Web browser 502 may select to view a map or other related information.

In a third phase, the user of browser 502 selects a hyperlink for a map which is transmitted back to ASP 510 which submits a request to the results object 524 to emit a map in a browser supported graphics format such as PNG or JPEG map 516. The results object 524 first creates a multi-layer map using the Puckett cartographic object library. The results object next uses the standard Puckett map rendering component to draw the map. The renderer 526 uses the standard cartographic object library as it draws.

Consequently, a user of Web browser 502 is able to determine a signal strength characteristic of a particular television station at a known street address through the use of the invention 500. In general, the user of Web browser 502 may be given information relating to the signal strength of a particular terrestrially broadcast television station at a particular location and whether or not that signal strength exceeds a predetermined threshold characteristic. The user of Web browser 502 may desire additional information relating to the signal strength and may request via Web browser 502 that a map in a format that is supported by the browser be generated. This map may show the geographic area in which the signal strength is believed to be in excess of a predetermined threshold. The user of Web browser 502 then may directly or indirectly manipulate a combination of a satellite receiver and a satellite transmitter in response to the signal strength signal so as to permit or deny access to a predetermined satellite signal based upon a comparison of a signal strength of the terrestrially broadcast television signal with a predetermined threshold. A designer may choose to use well-known devices such as Puckett point-in-polygon testers and Longley-Rice signal strength calculators.

Throughout this description, references are made to satellite receivers. It is intended that the present invention could also include internet receivers, which term shall include any appliance for receiving and either visually displaying information or producing an audible sound, as a result of receiving signals via the internet. This could include, but need not be limited to, personal computers, e-machines, internet appliances, etc. Throughout this description, references are made to television signals and television communication. It should be understood that these terms should include signals relating to radio, as well as those relating to television. Throughout this description, references are made to satellite signal controller, satellite control display rendering, and access regulation system. It should be understood that these terms could also include internet signal controllers, internet control display rendering, and as internet access regulation system, which terms should be understood to include any means to regulate access to signals or sites on the internet, including, but not limited to, passwords, cookies, electronic signatures, eletronic keys, encryption, and any other access regulating device used with respect ot internet communications, The details of any particular access restricting system, device, or scheme are not given here because the present invention is intended to include any type of access restricting system in the prior art, as well as future modifications of or substitute for such access restricting systems, devices, or schemes.

It is thought that the method and apparatus of the present invention will be understood from the foregoing description and that it will be understood from the foregoing description that it will be apparent that various changes may be made in limited to, passwords, cookies, electronic signatures, electronic keys, encryption, and any other access regulating device used with respect to internet communications. The details of any particular access restricting system, device, or scheme are not given here because the present invention is intended to include any type of access restricting system in the prior art, as well as future modifications of or substitute for such access restricting systems, devices, or schemes. the form, construction, steps and arrangement of the parts and steps thereof, without departing from the spirit and scope of the invention or sacrificing all of their material advantages. The form herein described being merely a preferred or exemplary embodiment thereof.

We claim:

1. An apparatus for regulating access to electronic digital communication signals comprising:

means for locating latitude and longitude coordinate for a particular location on the surface of the earth, and generating a location signal in response thereto;

means, responsive to said location signal, for generating a signal strength signal which is representative of a strength of a terrestrially broadcast television signal at said particular location; and means for manipulating a combination of a receiver and a transmitter in response to said signal strength signal, so that access to a predetermined electronic digital signal can be alternatively enabled and disabled for said particular location.

2. An apparatus of claim 1 wherein said receiver is a personal computer.

3. An apparatus of claim 1 wherein said transmitter is a server coupled to the internet.

4. An apparatus of claim 1 wherein said means for locating a latitude and longitude coordinate for a particular location includes a geocoding server, which takes street addresses and generates corresponding latitude and longitude coordinates.

5. An apparatus of claim 1 wherein said means for generating signal strength signals includes a signal strength server utilizing a Longley-Rice signal strength calculator to determine a geographic reception area having a signal strength above a predetermined threshold and further using a Puckett point-in-polygon tester to compare said coordinates with points inside said geographic reception area.

6. An apparatus of claim 5 wherein said means for locating a latitude and longitude coordinate for a particular location includes a geocoding server, which takes street addresses and generates corresponding latitude and longitude coordinates.

7. An apparatus of claim 6 wherein said means for manipulating includes a display screen for visually displaying information relating to an internet communication signal access characteristic for said particular location.

8. An apparatus of claim 7 wherein said geocoding server is a first computer coupled to a computer network.

9. An apparatus of claim 8 wherein said signal strength server is provided by said computer.

10. An apparatus of claim 8 wherein said signal strength server is provided by a second computer located separately from said first computer.

11. A method of regulating electronic digital communication signals comprising the steps of:

receiving an address of a predetermined location and generating a geographic reference signal having a predetermined signal format in response thereto;

determining a signal strength signal representative of a strength of a terrestrially broadcast signal received at said predetermined location; and comparing said signal strength signal to a predetermined threshold and generating in response thereto an electronic digital signal control signal for regulating access to electronic digital signals received at said predetermined location.

12. An apparatus comprising:

means for receiving an address of a predetermined location and generating a geographic reference signal having a predetermined signal format in response thereto;

means for determining a signal strength signal representative of a strength of a terrestrially broadcast signal received at said predetermined location; and means for comparing said signal strength signal to a predetermined threshold and generating in response thereto an internet signal control signal for regulating access to internet signals received at said predetermined location.

13. An apparatus of claim 12 wherein said means for receiving an address and generating a geographic reference signal is a first computer utilizing a Web browser to communicate with a coupled second computer utilizing a geocode server.

14. An apparatus of claim 13 wherein said means for determining is a third computer coupled to said second computer.

15. An apparatus of claim 14 further including a display device for displaying information relating to said internet signal control signal.

16. An internet signal control apparatus comprising:

a browser means at a first location for receiving information relating to a street address of a second location, a geocoding means for generating a latitude and longitude reference signal corresponding to said street address for said second location;

a processor based means, disposed at a third location and coupled to said first location via a computer network, said processor based means for generating a signal strength signal representative of a strength of a terrestrially broadcast signal at said second location, where said processor based means for generating utilizes a point-in-polygon approach and a Longley-Rice signal strength calculator to generate said signal strength signal;

said processor based means for generating further for comparing said signal strength signal with a predetermined reference level and generating in response thereto an internet signal control signal.

17. An apparatus of claim 1 wherein said electronic digital communication signals are signals transmitted via satellite.

18. A method of claim 11 wherein said electronic digital communication signals are transmitted via satellite.

19. A method of claim 11 wherein said electronic digital communication signals are signals sent over an internet connection to a personal computer.

20. A method of claim 19 wherein said electronic digital communication signals contain information representative of a broadcast television signal.

* * * * *